US010747814B2

(12) United States Patent
Liu et al.

(10) Patent No.: US 10,747,814 B2
(45) Date of Patent: Aug. 18, 2020

(54) HANDLING SEMI-STRUCTURED AND UNSTRUCTURED DATA IN A SHARDED DATABASE ENVIRONMENT

(71) Applicant: Oracle International Corporation, Redwood Shores, CA (US)

(72) Inventors: Zhen Hua Liu, San Mateo, CA (US); Beda C. Hammerschmidt, Los Gatos, CA (US); Sriram Krishnamurthy, San Francisco, CA (US); Ying Lu, Sunnyvale, CA (US); Douglas J. McMahon, Redwood City, CA (US); Srividya Tata, Bangalore (IN); Vikas Arora, Burlingame, CA (US)

(73) Assignee: Oracle International Corporation, Redwood Shores, CA (US)

( * ) Notice: Subject to any disclaimer, the term of this patent is extended or adjusted under 35 U.S.C. 154(b) by 396 days.

(21) Appl. No.: 15/848,737

(22) Filed: Dec. 20, 2017

(65) Prior Publication Data

US 2019/0102476 A1    Apr. 4, 2019

Related U.S. Application Data

(60) Provisional application No. 62/566,088, filed on Sep. 29, 2017.

(51) Int. Cl.
*G06F 16/30*    (2019.01)
*G06F 16/84*    (2019.01)
(Continued)

(52) U.S. Cl.
CPC .......... *G06F 16/86* (2019.01); *G06F 16/2471* (2019.01); *G06F 16/278* (2019.01);
(Continued)

(58) Field of Classification Search
CPC ........ G06F 16/83; G06F 16/81; G06F 16/278; G06F 16/30; G06F 16/2471; G06F 16/86
(Continued)

(56) References Cited

U.S. PATENT DOCUMENTS 5,551,027 A    8/1996  Choy et al.
5,983,213 A *  11/1999  Nakano ............... G06F 16/2219
(Continued)

FOREIGN PATENT DOCUMENTS

EP    2 608 072 A1    6/2013
WO    WO 03/107222 A1    12/2003
(Continued)

OTHER PUBLICATIONS

Beomseok Nam et al., "Spatial Indexing of Distributed Multidimensional Datasets", Cluster Computing and the Grid, dated 2005, 8 pages.
Bacon, Jean, "Naming Distributed Systems", dated Feb. 2, 2010, 28 pages.
Anonymous: "Oracle Database JSON Developers Guide 12c Release 2 (12.2)", dated Aug. 1, 2017, 196 pages.
(Continued)

*Primary Examiner* — Kuen S Lu
(74) *Attorney, Agent, or Firm* — Hickman Palermo Becker Bingham LLP (57) ABSTRACT

Techniques are described herein for leveraging and extending relational data sharding infrastructure to provide comprehensive support for sharding semi-structured and unstructured data, in addition to the relational data, in a single sharded database system. Specifically, techniques are described in which a catalog server pre-gathers all data it needs to answer fetches from a dynamically created temporary lob. In addition, techniques are provided in which a catalog server encodes shard identifiers in lob locators sent to the client. Techniques are provided for pushing down various operators to shard servers.

20 Claims, 4 Drawing Sheets

(51) Int. Cl.
*G06F 16/27* (2019.01)
*G06F 16/2458* (2019.01)
*G06F 16/83* (2019.01)
*G06F 16/81* (2019.01)

(52) U.S. Cl.
CPC .............. *G06F 16/30* (2019.01); *G06F 16/81* (2019.01); *G06F 16/83* (2019.01)

(58) Field of Classification Search
USPC ........................................................ 707/802
See application file for complete search history.

(56) References Cited

U.S. PATENT DOCUMENTS

| | | | |
|---|---|---|---|
| 5,999,943 | A | 12/1999 | Nori et al. |
| 6,738,790 | B1 * | 5/2004 | Klein ................. G06F 16/30 |
| 2008/0189303 | A1 | 8/2008 | Bush et al. |
| 2009/0063589 | A1 * | 3/2009 | Cox .................. G06F 16/24557 |
| 2017/0017683 | A1 | 1/2017 | Fourny et al. |
| 2017/0060973 | A1 | 3/2017 | Liu et al. |
| 2017/0103092 | A1 | 4/2017 | Hu et al. |
| 2017/0103094 | A1 | 4/2017 | Hu et al. |
| 2017/0103116 | A1 | 4/2017 | Hu et al. |

FOREIGN PATENT DOCUMENTS

| | | |
|---|---|---|
| WO | WO 2008/091705 A2 | 7/2008 |
| WO | WO 2015/069941 A1 | 5/2015 |
| WO | WO 2017/062288 A1 | 4/2017 |

OTHER PUBLICATIONS

Anonymous: "Part VIII JSON", In: "Oracle XML DB Developer's Guide 12c Release 1 (12.1)", dated Dec. 1, 2016, 39 pages.

Shukla et al., "Schema-Agnostic Indexing with Azure DocumentDB", Proceedings of the VLDB Endowment, vol. 8, No. 12, Copyright 2015 VLDB, 12 pages.

Oracle Database, "Introduction to Simple Oracle Document Access (SODA)", 18c E86033-04, dated August 2018, 96 pages.

Li et al., "Closing the functional and Performance Gap between SQL and NoSQL", ACM 978-1-4503-3531-7, dated Jun. 26, 2016, 12 pages.

Kleppmann et al., "A Conflict-Free Replicated JSON Datatype", dated Aug. 15, 2017, 17 pages.

Chasseur et al., "Enabling JSON Document Stores in Relational Systems", WebDB dated 2013, New York, New York, USA, 16 pages.

McHugh et al., "Lore: A Database Management System for Semistructured Data", SIGMOD, vol. 26 No. 3, dated Sep. 3, 1997, 14 pages.

* cited by examiner

HANDLING SEMI-STRUCTURED AND UNSTRUCTURED DATA IN A SHARDED DATABASE ENVIRONMENT

CROSS-REFERENCE TO RELATED APPLICATIONS

This application claims the benefit of Provisional Appln. 62/566,088, filed Sep. 29, 2017, the entire contents of which is hereby incorporated by reference as if fully set forth herein, under 35 U.S.C. § 119(e). This application is related to:

Provisional Application No. 62/238,193, filed Oct. 7, 2015

U.S. patent application Ser. No. 15/268,108 entitled "Request routing and query processing in a sharded database", filed Sep. 16, 2016

U.S. patent application Ser. No. 15/267,395 entitled "Relational Database Organization for Sharding", filed Sep. 16, 2016

U.S. patent application Ser. No. 15/268,318 entitled "DDL Processing in Sharded Databases", filed Sep. 16, 2016

U.S. patent application Ser. No. 15/268,438 entitled "Composite Sharding", filed Sep. 16, 2016 the entire contents of each of which is hereby incorporated by reference as if fully set forth herein.

FIELD OF THE INVENTION

The present invention relates to database systems and, more specifically, to database systems in which sharded tables store semi-structured data items.

BACKGROUND

Database systems that store increasingly large amounts of data are becoming more and more prevalent. For example, online transaction processing (OLTP) systems, such as e-commerce, mobile, social, and Software-as-a-Service (SaaS) system, typically require large database storage. Example applications for OLTP systems include, but are not limited to, large billing systems, ticketing systems, online financial services, media companies, online information services, and social media companies. Given the significant amount of data stored by these database systems, storing all the data on a single database instance is not practical, as the amount of data can utilize significant computing resources, such as processors, memory, and storage.

Furthermore, non-relational databases, sometimes referred to as NoSQL databases, do not provide the fully featured benefits of a relational database. For example, NoSQL databases do not offer the same schema control, atomicity, consistency, isolation, durability, or fully-featured structured query language (SQL) of a relational database.

To more efficiently handle well-structured relational data, techniques have been developed for "horizontally partitioning" a database. Horizontal partitioning involves decomposing a single larger table into smaller, more manageable subsets of information, called "partitions." Sharding is a data tier architecture where data is horizontally partitioned across independent database instances, where each independent database instance is referred to as a "shard." A collection of shards, together, makes up a single logical database which is referred to as a "sharded database" ("SDB"). Logically, a sharded database can be accessible to a client application just like a traditional unsharded database. However, tables in a sharded database are horizontally partitioned across shards.

Figure 1:
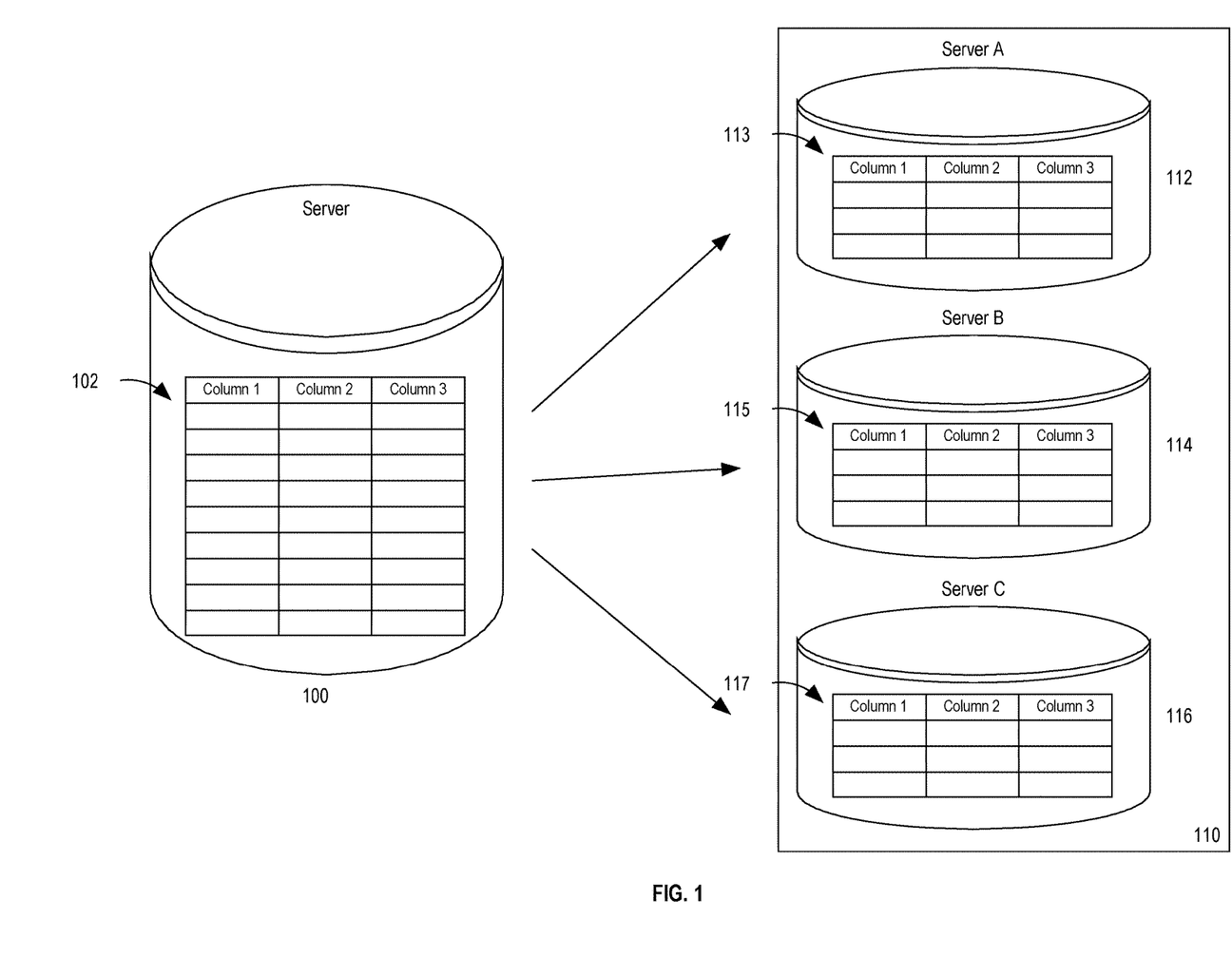
FIG. 1 is a block diagram showing the difference between an unsharded database and a sharded database.

FIG. 1 illustrates an example of an unsharded database 100 and a sharded database 110. Unsharded database 100 is a relational database and includes table 102. All of the contents of table 102 are stored in the same unsharded database 100, and thus use the same computing resources, such as processors, memory, and disk space.

Sharded database 110, however, depicts an alternative configuration using sharding techniques. Sharded database 110, includes three shards 112, 114, and 116. Each of the shards 112, 114, and 116 is its own database instance and includes its own tables 113, 115, and 117, respectively. However, in sharded database 110, table 102 has been horizontally partitioned across shards 112, 114, and 116 into tables 113, 115, and 117. Horizontal partitioning in a sharded database involves splitting a database table, such as table 102, across shards so that each shard contains a subset of rows of table 102. In this example, tables 113, 115, and 117 each contain a subset of rows of table 102. Collectively, tables 113, 115, and 117 can be referred to as a "sharded table." The data collectively stored in tables 113, 115, and 117 is equivalent to the data stored in table 102. Sharded database 110 is logically treated as a single database, and thus can be accessible by client applications just like unsharded database 100.

Figure 2:
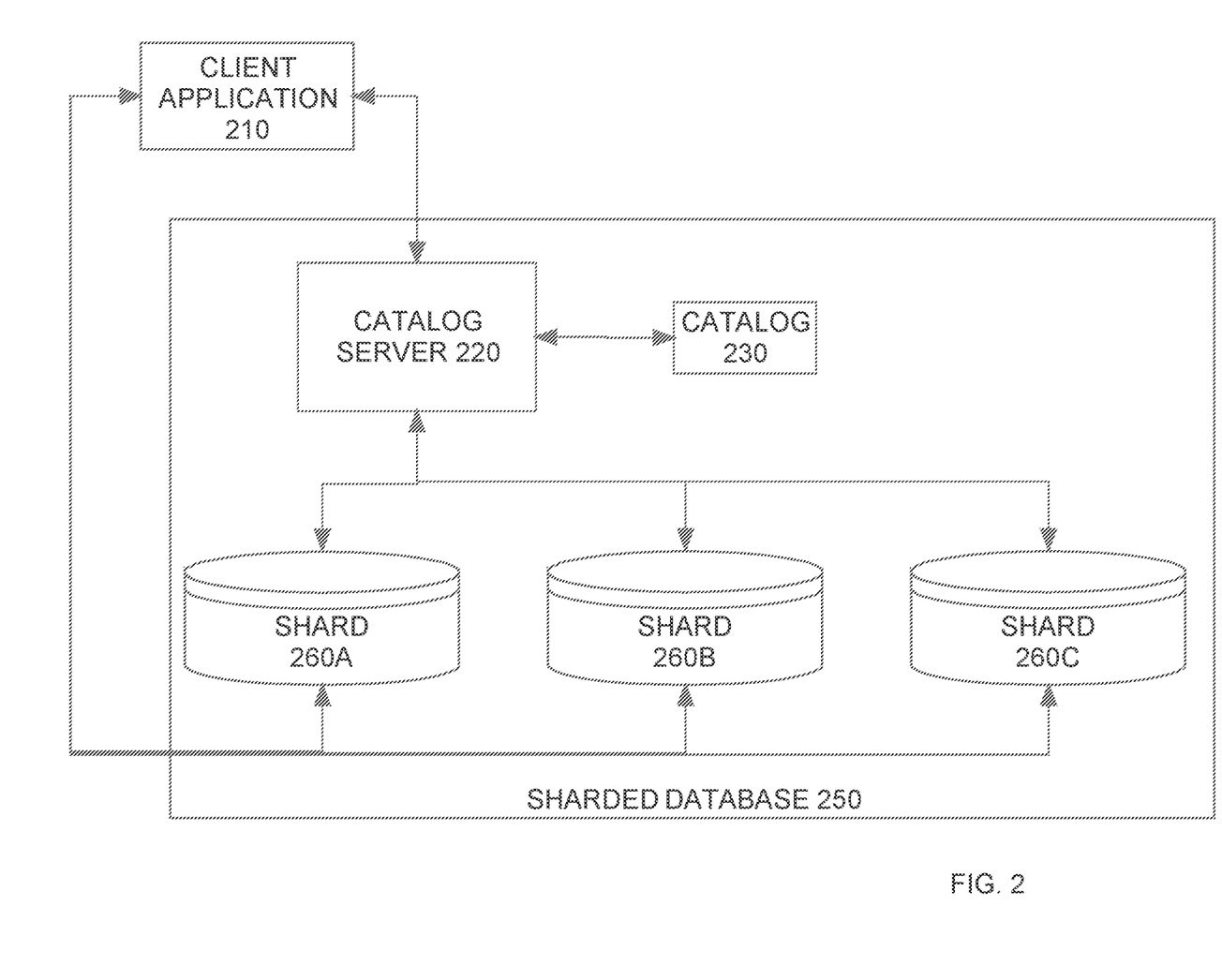
FIG. 2 is a block diagram of how a database application may interact with a sharded database.

FIG. 2 is a block diagram of a sharded database system. Client application 210 is any sort of client application that requires access to data stored in a database. Sharded database 250 is a logical database where data is horizontally partitioned across independent database instances. Specifically, data stored in sharded database 250 is horizontally partitioned and stored in shards 260A, 260B, and 260C. A sharded database may include any number of shards, and the number of shards in a sharded database may vary over time. Each of shards 260A, 260B, and 260C may be its own database instance that does need to share physical resources, such as processors, memory, and/or storage device, with other shards in the sharded database 250.

Shard catalogue 230 is a special database system that is used to store configuration data for the sharded database 250 and may include, for example: a routing table that maps which shard stores a chunk of data that corresponds to a given value, range of values, or set of values of a sharding key, shard topology data, the configuration of the shards 260A, 260B, and 260C, the configuration of the catalog server 220, information about the client application 210, etc. Catalog server 220 coordinates various functionalities across the sharded database 250, including, but not limited to: routing database requests to shards, propagating database schema changes to shards, monitoring the status of shards, receiving status updates from shards, receiving notifications from client applications, sending notifications to shards, sending notifications to client applications, and/or coordinating various operations that affect the configuration of the sharded database 260, such as resharding operations.

The horizontal partitioning techniques used by a sharded database improve scalability by eliminating performance bottlenecks and making it possible to increase performance and capacity of the system by adding additional shards and distributing load across shards. However, even when conventional relational database systems employ horizontally-partitioning, the needs of all users are not adequately addressed because those systems do not provide an agile document-object storage model that allows schema-less query, indexing, and search capability. Consequently, for users who deal with semi-structured data and unstructured data, horizontally partitioning a conventional relational table is insufficient. The term "semi-structured and unstructured data" refers to data items that are not known to strictly conform to any explicitly defined schema. Users who want to enjoy horizontal partitioning with both structured and unstructured data typically have to maintain multiple sharding systems and build a home-grown middle-tier to integrate both systems. Therefore, there is a clear need for a system that provides the benefits of horizontal partitioning regardless of whether the underlying data is fully-structured, semi-structured, unstructured, or any combination thereof.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for leveraging and extending relational data sharding infrastructure to provide comprehensive support for sharding data items that are not known to strictly conform to any explicitly defined schema, in addition to relational data, in a single sharded database system. The techniques employ a single backend database system solution instead of one sharding system for relational data, and another sharding system for semi-structured and non-structured data. The techniques provide a new declarative schema computation capability over sharded semi-structured data so that such data can be accessed in a more SQL-friendly way.

Unlike a pure RDBMS SQL sharding solution, the techniques provide general search index capability over relational data so that the data can be searched in a manner similar to that used in No-SQL systems. Further, because all types of data reside in one system, a declarative bi-directional query transformation capability is provided so that sharded relational data can be accessed as if the data were sharded semi-structured data, and sharded semi-structured data can be accessed as if the data were sharded relational data.

Techniques are described in which a catalog server pre-gathers all data it needs to answer fetches from a dynamically created temporary lob. In addition, techniques are provided in which a catalog server encodes shard identifiers in lob locators sent to the client. Techniques are also provided for pushing down various operators to shard servers.

System Overview

Figure 3:
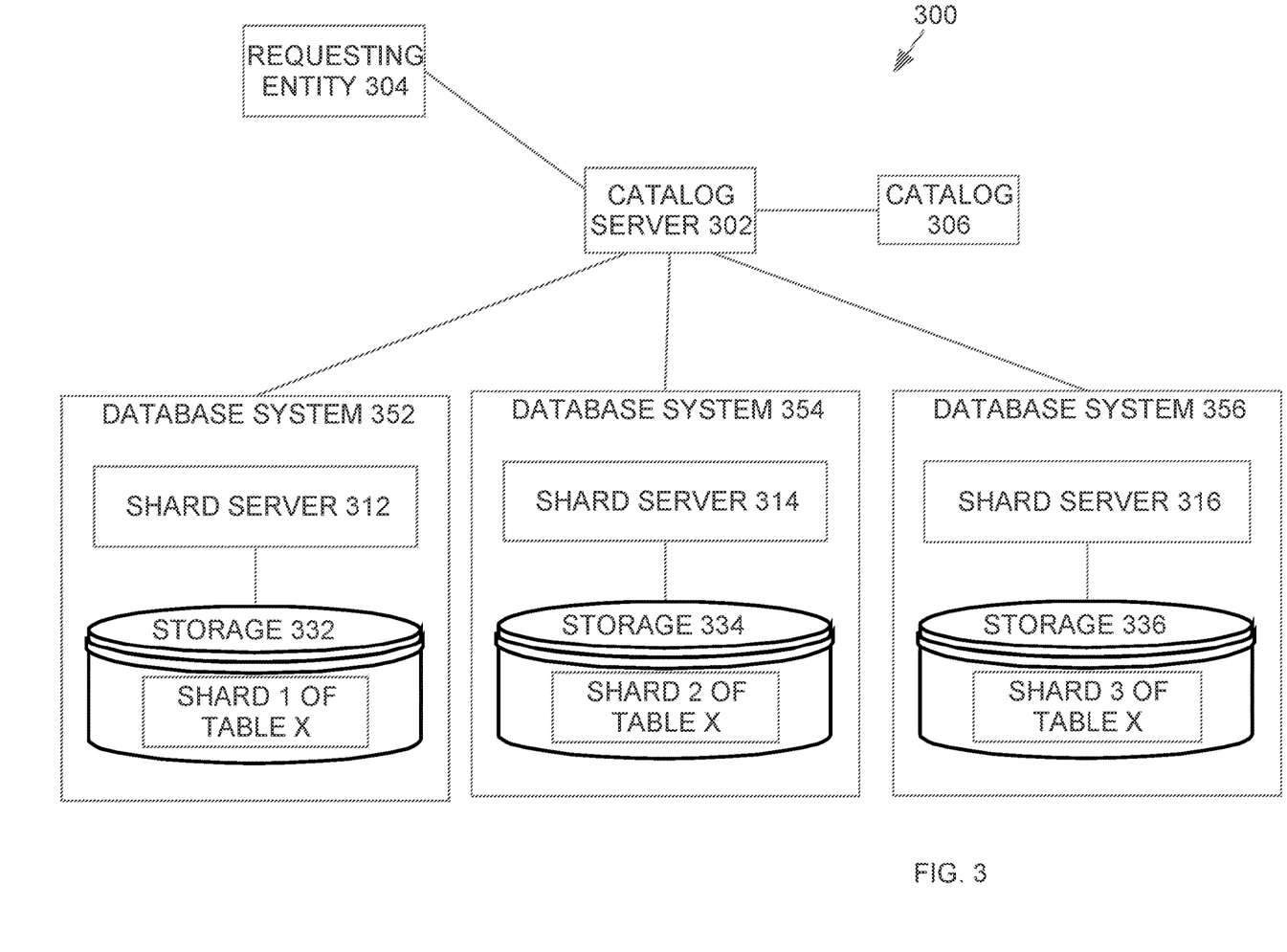
FIG. 3 is a block diagram of a sharded database system in which a table has been divided into three shards.

Referring to FIG. 3, it is a block diagram that illustrates a sharded database system 300 designed to apply horizontal partitioning to containers that store structured, semi-structured and/or un-structured data. Sharded database system 300 includes a catalog server 302 that receives cross-shard queries. A "cross-shard query" refers to any database command that involves a container that has been horizontally partitioned within sharded database system 300. The cross-shard queries that are received by catalog server 302 may be from any type of software program that stores data within sharded database system 300. Typical software programs that initiate cross-shard queries include database client applications and database servers that reside outside sharded database 300. The techniques described herein are not limited to any particular type of database request source. For the purpose of explanation, the source from which catalog server receives a cross-shard query is illustrated as requesting entity 304.

Catalog server 302 manages a catalog 306 that includes information about the topology of sharded database system 300. Specifically, catalog 306 indicates how each sharded object in sharded database system 300 is sharded and, for each shard of each sharded object, which database server within the sharded database server system 300 is responsible for the shard.

The database server instances within a sharded database system are referred to as shard servers. In the illustrated embodiment, sharded database system 300 has three shard servers (312, 314 and 316) that respectively belong to database systems 352, 354 and 356. Database systems 352, 354 and 356 may be co-located or geographically dispersed. Often, the database systems that belong to a sharded database system are in different regions of a country, or in different countries around the globe. Catalog server 302 itself may also be a shard server. However, to facilitate explanation, it shall be assumed that catalog server 302 is not a shard server.

Each of the shard servers (312, 314 and 316) has its own local set of one or more processors, its own volatile memory. In addition, each of shard servers 312, 314, and 316 has access to storage 332, 334 and 336, respectively. For horizontal partitioning purposes, each shard of sharded table X is assigned to only one of the shard servers. For the purpose of explanation, it shall be assumed that shards 1, 2 and 3 of table X are assigned respectively to shard servers 312, 314 and 316. While shown as single devices, each of storages 332, 334 and 336 may include any number and types of persistent storage devices.

In an alternative embodiment, shared server 312, 314 and 316 have access to the same shared disk. However, even in such an embodiment, to obtain the benefits of the horizontal partitioning, it is preferable that all cross-shard queries be directed to catalog server 302, which can divide the work up between the shard servers 312, 314 and 316 based on the shard-to-shard-server mappings indicated in catalog 306.

According to some embodiments, requesting entity 304 retains connections with each of the shard servers 312, 314 and 316 to enable the requesting entity 304 to interact directly with shard servers 312, 314, and 316. As shall be explained in greater detail hereafter, such direct interaction may occur after the work of a cross-shard query has been divided up and distributed to the shard servers 312, 314 and 316 by catalog server 302.

According to some embodiments, requesting entity 304 may itself maintain data indicating the shard-to-shard-server mapping, and make use of that mapping data to intelligently determine where to send a query that targets a sharded table. For example, assume that requesting entity 304 maintains data indicating that:

- shard 1 is assigned to shard server 312 and includes all rows where age <10
- shard 2 is assigned to shard server 314 and includes all rows where age >=10 and <30
- shard 3 is assigned to shard server 316 and includes all rows where age >=30

Assume that requesting entity 304 requires execution of a query where the predicate is "age=9". Based on the predicate and the mapping data, requesting entity 304 determines that all data required to answer the query is in shard 1. Consequently, requesting entity 304 would send the query directly to shard server 312 because it is the shard server to which shard 1 is assigned.

Creating Sharded Containers for Non-Relational Data

Within conventional relational database systems, data tends to be organized in a highly-structured manner. Specifically, data is often stored in relational tables, where each row represents a set of related data (e.g. information about a particular person), and each column corresponds to a particular attribute (e.g. name, address, age, etc.). However, using relational tables to store and access data that has less structure is less straightforward.

It is becoming increasingly important to be able to store and efficiently access data that is less structured or entirely unstructured. Semi-structured data, such as XML (Extensible Mark-up Language), JSON (JavaScript Object Notation), etc. are the primary data model to support schema-less development paradigm where users do not have to specify schema in order to store data and query data.

Because a schema is not required ahead of time to store semi-structured data, users have freedom to store any original forms of the semi-structured data on disk. Unfortunately, this freedom comes at the price of performance. Certain techniques, such as those described in U.S. patent application Ser. No. 15/162,235, entitled "EFFICIENT IN-MEMORY DB QUERY PROCESSING OVER ANY SEMI-STRUCTURED DATA FORMATS", can be used to improve a database server's performance of operations that target semi-structured data. The entire contents of that application is incorporated herein by this reference. However, those techniques do not involve horizontal partitioning of the semi-structured data, and therefore do not provide the performance benefits that accrue from horizontal partitioning.

According to one embodiment, to achieve those benefits for semi-structured data, the database language supported by the database servers is extended to enable users to specify horizontal partitioning criteria for containers that hold semi-structured data. For example, according to one embodiment, the following command (CMD1) may be used to create a sharded table for storing, among other things, JSON documents.

```
CREATE SHARDED TABLE Departments
( DepartNo NUMBER NOT NULL,
    ....
    DepartInfo VARCHAR2(4000) -- can be CLOB/BLOB type as well
        Check (DepartInfo IS JSON)),
    CONSTRAINT RootPK PRIMARY KEY(DepartNo)
)
PARTITION BY CONSISTENT HASH (DepartNo)
PARTITIONS AUTO
TABLESPACE SET ts1;
                          CMD1
```

In CMD1, the line "CREATE SHARDED TABLE Departments" instructs the catalog server 302 to create a sharded table with the name "Departments". The table has two columns "DepartNo" and "DepartInfo." The DepartNo column holds values of type "number", and is not allowed to be empty (i.e. "not null"). The DepartInfo stores semi-structured data. VARCHAR2(4000) indicates that, from the perspective of the relational database server, the DepartInfo column will simply contain an unstructured string of characters. The relational data types CLOD (character large object) and BLOB (binary large object) could also be used to store semi-structured data.

JSON documents are typically not completely without structure. Therefore, the line "Check (DepartInfo IS JSON)))" indicates that, prior to storing any data in the DepartInfo column, a check must be made to verify that the data represents a valid JSON document.

CMD1 further specifies that "DepartNo" is the key for horizontally partitioning the Departments table, that the partitioning should be done by hashing the DepartNo values, and that the number of partitions is to be chosen automatically by the system (PARTITIONS AUTO).

To create the Departments table, requesting entity 304 sends CMD1 to catalog server 302. Catalog server 302 determines how many shards to create, determines the shard-to-shard-server mapping, and then sends commands to each of the shard servers to cause creation of the respective shards. For the purpose of illustration, it shall be assumed that catalog server 302 determines that three shards (shard 1, shard 2 and shard 3) should be created, and that shards 1, 2 and 3 are to be assigned to shard servers 312, 314 and 316, respectively. Catalog server 302 stores information about how Departments is sharded, and the shard-to-shard-server mapping, in catalog 306. Catalog server 302 may then send to each of shard servers 312, 314 and 316 commands to cause them to create their respective shards of the new Departments table. The shard-to-shard-server mapping may be one-to-one or many-to-one (e.g. a single shard server may be assigned a plurality of shards).

As another second example, the following command (CMD2) may be used to create a sharded table for storing, among other things, JSON documents.

```
create SHARDED table GKD_DATA(id number, docdate date,
GKGRECORDID VARCHAR2(30), doc blob check (doc is json))
PARTITION BY RANGE ("DOCDATE")
(PARTITION "SYS_ZERO"
VALUES LESS THAN (TO_DATE(' 1941-11-30 00:00:00',
'SYYYY-MM-DD HH24:MI:SS', 'NLS_CALENDAR=GREGORIAN'))
TABLESPACE ts1 );
alter table GKD_DATA add partition "SYS_ONE" VALUES LESS
THAN(TO_DATE(' 2001-11-30 00:00:00', 'SYYYY-MM-DD
HH24:MI:SS', 'NLS_CALENDAR=GREGORIAN'))
TABLESPACE ts2 ;
alter table GKD_DATA add partition "SYS_TWO" VALUES LESS
THAN(TO_DATE(' 2020-11-30 00:00:00', 'SYYYY-MM-DD
```

-continued

```
HH24:MI:SS', 'NLS_CALENDAR=GREGORIAN'))
TABLESPACE ts3 ;
alter table GKD_DATA add partition "SYS_THREE" VALUES LESS
THAN(TO_DATE(' 2025-11-30 00:00:00', 'SYYYY-MM-DD
HH24:MI:SS', 'NLS_CALENDAR=GREGORIAN'))
TABLESPACE ts4;
                             CMD2
```

The table (GKD_DATA) created by CMD2 would be handled in the same manner as explained above with respect to CMD1. Specifically, requesting entity 304 sends CMD2 to catalog server 302, and catalog server 302 stores the sharding information in catalog 306 and sends the appropriate commands to shard servers 312, 314 and 316 to cause the specified shards of GKD_DATA to be created. The columns of GKD_DATA are id, docdate, GKGRECORDID, and doc, which are of data types number, date, VARCHAR2, and blob, respectively. In this example, the GKGRECORDID column stores semi-structured data, so a check constraint is defined on the column to ensure that data stored in the column is a valid JSON document. CMD2 differs from CMD1 in that the partitioning is in CMD2 is user-defined partitioning by range, rather than auto partitioning by hash. Consequently, in CMD2, the user has specified the number of partitions as well as the partition key ranges that map to each of the partitions. In response to executing CMD2, four shards (SYS_ZERO, SYS_ONE, SYS TWO, and SYS THREE) of GKD_DATA are created.

In both CMD1 and CMD2, the partitioning/sharding key is an actual column of the target table. However, in alternative embodiments, the partitioning/sharding key may be a virtual column that is extracted from the column containing the semi-structured data. For example, rather than being explicitly defined in any table definition, the "docdate" value, which is compared against the partitioning ranges to determine the partition/shard into which a given row should be stored, can be a value that is extracted from the semi-structured data item in the GKD_DATA column for that given row. When data is extracted from a semi-structured column of a row in this manner, the data is said to come from a "virtual column" of the row. To support virtual columns, the database servers that extract the target information from the semi-structured data make use of metadata that indicates how to parse the semi-structured data to obtain the target information.

Self-Contained Semi-Structured Data Storage Format

In a sharding environment, it is common for the system to provide automatic sharding capability to achieve load balancing (as with CMD1 described above). Consequently, re-sharding often involves copying tablespaces from one storage device to another. To facilitate such re-sharding, in one embodiment, the semi-structured data stored in the sharded tables is self-contained. XML and JSON text are naturally self-contained. An item that includes encoded data (e.g. binary XML) may be self-contained by keeping the information required to decode the encoded data with the item. A self-contained semi-structured data item, such as a self-contained document, does not rely on any global dictionary at the catalog server level or on any shard-server-level dictionary. Thus, each shard server is able to independently answer any query on data in its assigned shard(s) without having to interact with the catalog server or other shard servers, even when the data was previously migrated from a shard assigned to a different shard server. According to one embodiment, semi-structured data may be self-contained as long as the decoding information is stored at the same level of granularity as the granularity at which the data is migrated/redistributed. For example, if data is migrated/redistributed at the row level of granularity, then the row is self-contained when decoding information for a row is stored and moved in conjunction with that row. On the other hand, if the data is migrated/redistributed in larger chunks (which may range in granularity from a "slice" of a few rows up to a partition, set of partitions, tablespace, or set of tablespaces), then each of those larger chunks contains the decoding information for all semi-structured data within that chunk.

According to one embodiment, a "chunk" may include one or more partitions from each of multiple tables. For example, assume that a table T1 is partitioned into partitions T1a, T1b and T1c. Assume that a table T2 is partitioned into partitions T2a, T2b and T2c. These partitions may be assigned to three chunks, where the first chunk has partitions T1a and T2a, the second chunk has partitions T1b and T2b, and the third chunk has partitions T1c and T2c. Data migration may be performed at the granularity of such chunks. Thus, during re-sharding operations where sharded data is migrated between shards, partitions T1a and T2a are treated as an indivisible unit because they belong to the same chunk.

As an alternative to self-contained semi-structured data, the semi-structured data may be encoded at the shard-server level. Similar to self-contained data, data encoded at the shard-server-level allows each shard server to independently answer queries that target data in its assigned shard without involving the catalog server or any other shard server. Shard-server level encoding achieves this independence while still allowing the semi-structured data to be represented in a more compact binary format. However, having a shard-server-level dictionary implies slow re-sharding operations. For example, re-sharding may involve merging the local shard-specific dictionaries (which may have conflicting identifier-to-value mappings). Also, using shard-server-level dictionaries for cross-shard queries tends to be slower as each shard server needs to generate self-contained binary format during query execution time so that the catalog server and the client can digest a binary format without incurring the cost to get the shard-server-level local dictionary.

Encoding Shard Identifiers in Lob Locators

Large Object (LOB) columns are frequently used to store semi-structured and unstructured data. In the CMD2 example given above, JSON "doc" items are stored in a BLOB column. Lobs are often returned "by reference" rather than "by value". That is, rather than return an entire lob or set of lobs in response to a client's query, the database server may return a lob locator. LOB locators do not contain the unstructured data itself, but instead are data structures that contain information that can be used to retrieved the unstructured data. Lob locators are described in detail in U.S. Pat. No. 5,999,943, the entire contents of which are incorporated herein by reference.

For the purposes of illustration assume that requesting entity 304 submits the following cross-shard query (Q0) to catalog server 302 to retrieve data from the LOB column of the table GKD_DATA created by CMD2:
Q0: SELECT ID, DOC FROM GKD_DATA In response to receiving Q0 from requesting entity 304, catalog server 302 sends queries to each shard servers 312, 314 and 316. Shard servers 312, 314, 316 process their respective queries and send the results back to catalog server 302. The "results" in this case may be sets of lob locators, rather than the full content of the matching documents themselves. Specifically, since the LOB column data is processed via reference, catalog server 302 only receives a lob locator from each shard server.

When requesting entity 304 gets a lob locator from the catalog server 302, the requesting entity 304 uses the information in the lob locator to request catalog server 302 to read and fetch the content of the LOB. This forces the catalog server 302 to send the lob read request back to the appropriate shard server to process. However, the catalog server 302 may have LOB locators returned from multiple shard servers. Thus, the catalog server 302 needs a means for knowing to which shard server to send any given fetch request.

According to one embodiment, when catalog server 302 provides to database clients any lob locators to lobs from sharded tables, the catalog server 302 encodes a "shard identifier" into the lob locators. A "shard identifier" is any information that uniquely identifies the shard server from which a lob locator was initially provided. A shard server may be associated with multiple shard identifiers (for example, chunk IDs may be used as the shard identifiers), but any given shard identifier maps only to one shard server.

For example, assume that during the processing of Q0, shard servers 312, 314 and 316 return to catalog server 302 the lob locators LL1, LL2 and LL3, respectively. When providing the lob locators to a database client (such as requesting entity 304), catalog server 302 encodes a shard identifier into each of the lob locators. For example, assume that catalog server 302 encodes LL1 with a shard identifier SI1 that maps to shard server 312, encodes LL2 with a shard identifier SI2 that maps to shard server 314, and encodes LL3 with a shard identifier SI3 that maps to shard server 316.

Encoding a shard identifier into lob locators provided to clients allows the clients to transparently provide the shard identifier back to catalog server 302 when performing operations involving the lob locator. For example, prior to providing LL1 to requesting entity 304, catalog server 302 would encode SI1 into LL1. When requesting entity 304 subsequently sends catalog server 302 a fetch request based on LL1, catalog server 302 can extract SI1 from the information received from requesting entity 304. Catalog server 302 then uses SI1 to determine that the fetch operation should be forwarded to shard server 312, since SI1 indicates that shard server 312 was the original source of lob locator LL1.

In an embodiment that uses chunk id as the shard identifier, catalog server 302 inspects the sharding metadata stored in catalog 306 to determine the shard server to which the identified chunk id maps. In the present example, the sharding metadata in catalog 306 would indicate that the chunk identified by SI1 maps to shard server 312. Consequently, catalog server 302 would forward fetches that are made based on that lob locator to shard server 312.

According to one embodiment, a client can determine whether lobs are returned "by value" or "by reference". Such a determination may be made, for example, based on factors such as the amount of semi-structured data that the client expects to be returned to the client. For example, if the amount of semi-structured data that is to be returned by a shard server to the client is below the threshold, then the client can request the results "by value" rather than "by reference". That is, the actual data that satisfies the query is returned. In such cases, the catalog server 302 simply forwards the data to the client, and need not encode any shard identifier in the response. In one embodiment, all of the shard servers either provide their results by value, or all provide their results by reference. In an alternative embodiment, some may provide results by value while others provide by reference, based on the amount of data each shard server is returning in response to the query.

In one embodiment, the database can be extended to support a type of lob that is always returned "by value". When a column stores semi-structured or unstructured data in a column that has been defined as by-value-only-lob, then the shard servers always return the actual data, and the catalog server need not encode any shard identifiers in the results that are returned to the client.

Temporary Lobs

The items stored in a column that has been defined as a lob datatype qualify as "persistent lobs". In some situations, data that is stored as non-lob datatypes may be aggregated together and treated by the database system as a lob. Such dynamically-constructed lobs are referred to as "temporary lobs". According to one embodiment, the shard servers create temporary lobs to contain the data, from the shards assigned to them, that satisfy the queries provided to them by the catalog server. Each shard server passes to the catalog server a lob locator to the temporary lob it creates. The catalog server then encodes these lob locators with the appropriate shard identifier, as described above, before providing the lob locators to the client.

Unfortunately, handling temporary lobs in that manner can be error prone, given that the metadata for any given temporary lob is dynamically created as session-specific metadata. Further, every interaction may involve the client using a locator to a temporary lob created by the catalog server, the catalog server using locators to temporary lobs created by each of the shard servers, the shard servers returning unstructured data to the catalog server (and updating their own session-specific temporary-lob metadata), and the catalog server returning the unstructured data to the client (and updating its own session-specific temporary-lob metadata).

Cross-Shard Query Returning Temporary Lob

To reduce the complexity of such interactions, an embodiment is provided in which the shard servers do not themselves create temporary lobs. Instead, the shard servers return the data that satisfies the cross-shard query "by value" to the catalog server. The catalog server organizes the data it receives from the various shard servers into a single temporary lob, and a locator for that temporary lob is provided to the client. All subsequent requests made by the client based on that lob locator can be answered directly from the temporary lob stored at the catalog server, without further involving the shard servers or requiring them to incur the bookkeeping overhead of maintain their own temporary lobs.

Another benefit of having the shard servers provide their results "by value" to the catalog server is to allow the catalog server to apply conditions, such as "top N", that cannot be applied by the individual shard servers. For example, assume that the cross-shard query requests the 10 highest sales months. In this case, rather than have each shard server create a temporary lob with its sales information, the sales information may be provided to the catalog server. Having received the data from all shards at the catalog server, the catalog server may then apply the top N filter. As a result of applying the filter, it is possible that all information provided by one of more of the shard servers is filtered out of the temporary lob created by the catalog server. According to one embodiment, to reduce the amount of information provided by each shard server, the "top N" condition may be "pushed down" by the catalog server to each shard server. In response, each shard server would apply the "top N" condition to its query results, and provide only its local top N items to the catalog server. Thus, the catalog server would receive the local top N items from each shard server, merge and sort the local results, find the global top N items, and create a temporary lob for those items. The catalog server would then return to the client a lob locator to the temporary lob it dynamically created.

Queries that have the form JSON_QUERY( . . . returning clob) and JSON_VALUE( . . . returning clob) in the select list are examples of situations in which the catalog server may create a temporary lob and return a lob locator to that temporary lob to the requesting entity. In one embodiment, each shard server returns a temporary lob locator SL to the catalog server, the catalog server creates its local temporary lob locator CL. To obtain data for the temporary lob created by the catalog server, the catalog server reads content using the temporary lob locator SL from the shard server and copies the content into the temporary lob associated with lob locator CL. After reading all necessary content, the catalog server frees the temporary lob locator SL and returns CL to the requesting entity. By pro-actively fetching to the catalog server all data using the shard-server-based lob locators, the resources allocated to shard-server-based lobs can be reclaimed early, and not as part of the garbage collection of the temporary lob created by the catalog server. Consequently, remote lob garbage collection crossing the client/catalog server/shard server chain is avoided.

Specifically, once the shard server sends a lob locator for a temporary lob to the catalog server, the catalog server pro-actively fetches all data from the temporary lob and then frees the shard server temporary lob so that shard server is free to release the corresponding resources. At that point, all further interaction involving the cross-shard query is only between the catalog server and its database client. The database client can also pro-actively fetch all data from the catalog server's temporary lob to allow the resources of the catalog server's temporary lob to be freed up early.

In one embodiment, value-based temporary lobs are used all the way through to the database client. Thus, when a catalog server gets value-based lobs from the shard servers, the catalog server copies the data, creates a value-based lob, and causes the shard-server lobs to be freed up. Then, when the database client gets a value-based temporary created by the catalog server, the database client copies the lob and then frees the catalog server's temporary lob so that catalog server is free to release the resources consumed by the temporary lob it created.

Semi-Structured Data SQL Operator Cross-Shard Query Push Down

According to one embodiment, items containing structured and semi-structured data can be accessed using semi-structured operators though the items themselves reside in sharded relational tables. For example, JSON_EXISTS( )/XMLEXISTS( ) SQL operator may be used in the WHERE clause of a SQL query. As another example, JSON_VALUE( ), JSON_QUERY( ) may be used in a SQL query's select list and/or WHERE clause. Consider the following two queries:

Q1: select json_value(doc, '$.gkg."@date"') , json_query(doc, '$.gkg.themes.theme')
from GKD_DATA;

Query Q1 calls for extraction of the "date" and "theme" attribute values from within the semi-structured data items stored in the doc column of the sharded GKD_DATA table.

Q2: SELECT count (*) DISTINCT FROM GKD_DATA WHERE JSON_EXISTS(doc,
'$.gkg.themes.theme');

Query Q2 determines the number (count) of semi-structured items, in the doc column of the sharded GKD_DATA table, that have distinct "theme" attribute values.

According to one embodiment, during cross-shard query compilation time of such queries, the catalog server identifies the semi-structured SQL operators within the cross-shard query and marks them as "push-downable" to each shard server so that each shard server will individually evaluate semi-structured SQL operators. For example, the following explain plan indicates the operation performed by the catalog server during the processing of query Q1:

| Q1 explain plan | | |
|---|---|---|
| Id | Operation | Name |
| 0 | SELECT STATEMENT | |
| 1 | SHARD ITERATOR | |
| 2 | REMOTE | |

This explain plan for Q1 indicates that, during execution of the select statement of Q1, the catalog server sends out remote SQL (indicated by "REMOTE") to each of the shard servers (indicated by "SHARD ITERATOR"). The remote SQL command sent to each of the shard servers causes the shard servers to perform the actual execution of the semi-structured operations. In the present example, in one embodiment, the explain plan for the remote SQL command sent to each of the shard servers by the catalog server for Q1 is:

Remote SQL Information (identified by operation id):
--------
2 - EXPLAIN PLAN INTO PLAN_TABLE@! FOR SELECT
JSON_VALUE("A1"."DOC"
FORMAT JSON , '$.gkg."@date"' RETURNING
VARCHAR2(4000) NULL ON
ERROR),JSON_QUERY("A1"."DOC" FORMAT
JSON , '$.gkg.themes.theme'
RETURNING VARCHAR2(4000) WITHOUT ARRAY
WRAPPER NULL ON ERROR) FROM
"GKD_DATA" "A1" /* coord_sql_id=fsp6d1k51cr9q */
(accessing 'ORA_SHARD_POOL.RE-
GRESS.RDBMS.DEV.US.ORA-
CLE.COM@ORA_MULTI_TAR
GET' )

As is evident by this explain plan, the individual shard servers execute the operations associated with the semi-structured operation, and return the results to the catalog server to enable the catalog server to present the aggregated results to the requesting entity that submitted query Q1.

As another example, the following explain plan indicates the operation performed by the catalog server during the processing of query Q2:

| | Q2 Explain Plan | |
|---|---|---|
| Id | Operation | Name |
| 0 | SELECT STATEMENT | |
| 1 | SORT AGGREGATE | |
| 2 | VIEW | VW_SHARD_0A7B 4793 |
| 3 | SHARD ITERATOR | |
| 4 | REMOTE | |

Similar to Q1, in processing Q2 the catalog server pushes the operations required by the semi-structured operations to the shard servers. However, in the case of Q2, the catalog server has to perform some additional work on the data (SORT AGGREGATE) after receiving the results from the shard servers and before providing the results to the requesting entity that initially submitted Q2. This additional work may, for example, reflect that the data is to be sorted in order to eliminate duplicates in the case of a Count DISTINCT operation.

As with Q1, the remote SQL command sent to each of the shard servers in response to Q2 causes the shard servers to perform the actual execution of the semi-structured operations. In the present example, in one embodiment, the explain plan for the remote SQL command sent to each of the shard servers by the catalog server for Q2 is:

```
Remote SQL Information (identified by operation id):
----------------------------------------------------
    4 - EXPLAIN PLAN INTO PLAN_TABLE@! FOR SELECT
        COUNT(*) FROM "GKD_DATA"
        "A1" WHERE JSON_EXISTS("A1"."DOC" FORMAT
        JSON , '$.gkg.themes.theme' FALSE ON
        ERROR)=1 /* coord_sql_id=2rdcr6jpgrw3n */ (accessing
        ' ORA_SHARD_POOL.REGRESS.RDBMS.DEV.US.ORA-
        CLE.COM@ORA_MULTI_TARGET ' )
```

In the examples given above, the remote SQL sent to the shard servers includes many command options (e.g. "WITHOUT ARRAY WRAPPER NULL ON ERROR") that were not in the initial cross-shard queries received by the catalog server. In one embodiment, these command options are included in the remote SQL commands by the catalog server based on system defaults. If a cross-shard query received by the catalog server includes options that differ from the defaults, the remote SQL includes the options explicitly specified in that cross-shard query. However, for all options that the cross-shard query does not explicitly override, the catalog server makes the default options explicit in the remote SQL sent to the shard servers to avoid any chance of deviation in the command options used by the shard servers.

Shard-Specific Indexing for Semi-Structured Data in Sharded Tables

According to one embodiment, when the catalog server receives a Data Definition Language (DDL) command to index a sharded table, the catalog server pushes the command to each of the shard servers to cause each of the shard servers to create a local index for its respective shard of the sharded table. The following are examples of commands for creating a search index on a sharded table that contains semi-structured data.

```
create search index jidx on departments(DepartInfo) for json
local;
create search index oidx on GKD_DATA(Doc) for json local;
```

In response to such a command, a general schema-less search index is created to search semi-structured and unstructured data in a manner that is typically employed in No-SQL database systems. In one embodiment, per-table-partition indexes are created, so that data in any given partition has a respective index. Because each shard server has one or more local indexes for its respective shard of the table, the indexes will generally be smaller and have less contention than a single global index for the table. As shall be described hereafter, the shard servers make use of the indexes when the catalog server pushes to the shard servers predicates from cross-shard queries.

If a DDL statement to create an index on semi-structured data is sent to a shard server, rather than the catalog server, the shard server creates the specified index based on the semi-structured data within its shard. To the extent that the shard server receives remote SQL from the catalog server that can benefit from the index, the shard server compiles the remote SQL to take advantage of the index even though the other shards, which may receive the same remote SQL, do not have such an index. Thus, when receiving remote SQL, each shard server compiles the remote SQL to take advantages of whatever access structures it has available for the semi-structured data in its shard, regardless of whether those same access structures are available for the semi-structured data in the other shards.

Search Predicate Push Down to Promote Local Index Usage

As mentioned above, predicates involving semi-structured operators may be pushed down to the shard servers, and the shard servers may use shard-specific indexes that have been built on the semi-structured data in their shard to more efficiently process such predicates. The following two queries (Q3 and Q4) are examples of situations in which local indexes on semi-structured data may be used by the shard servers to more efficiently process the queries:

```
Q3: SELECT count(*) FROM GKD_DATA WHERE
    JSON_EXISTS(doc,
    '$.gkg.themes.theme');
Q4: select count(*) from GKD_DATA where
    json_textcontains(doc,
    '$.gkg.locations.location."@name"',
    'Dublin' );
```

During cross-shard query compilation time, the catalog server rewrites the semi-structured SQL operators into its domain search index operators, and marks them as push downable to each shard server so that each shard server will individually evaluate semi-structured SQL operators using its respective local domain search index. The operations performed by the catalog server to process Q3, according to one embodiment, are shown in the following explain plan:

| Q3 Explain Plan | | |
|---|---|---|
| Id | Operation | Name |
| 0 | SELECT STATEMENT | |
| 1 | SORT AGGREGATE | |
| 2 | VIEW | VW_SHARD_0A7B4793 |
| 3 | SHARD ITERATOR | |
| 4 | REMOTE | |

The remote SQL that the catalog server sends to each shard servers to process query Q3 may be, for example:

```
Remote SQL Information (identified by operation id):
-----------------------------------------------------
4 - EXPLAIN PLAN INTO PLAN_TABLE@! FOR SELECT COUNT(*)
   FROM "GKD_DATA" "A1" WHERE JSON_EXISTS
   ("A1"."DOC" FORMAT JSON , '$.gkg.themes.theme' FALSE ON
   ERROR)=1 /* coord_sql_id=2rdcr6jpgrw3n */ (accessing
   ' ORA_SHARD_POOL.REGRESS.RDBMS.DEV.US.
   ORACLE.COM@ORA_MULTI_TARGET ' )
```

Significantly, this remote SQL generated by the catalog server makes no mention of any index, because the indexes on the semi-structured data were created by the shard servers, not centrally at the catalog server. However, upon compiling the remote SQL at a shard server, the shard server is aware of the available shard-specific indexes on the semi-structured data. Consequently, the explain plan generated by a shard server for the remote SQL for query Q3 may be:

| Id | Operation | Name |
|---|---|---|
| 0 | SELECT STATEMENT | |
| 1 | SORT AGGREGATE | |
| 2 | PARTITION RANGE ALL | |
| 3 | PARTITION HASH ALL | |
| * 4 | DOMAIN INDEX | OIDX |

As is evident by this explain plan, in generating its local result set for the remote query for Q3, each shard server uses its shard-specific index that was built on the semi-structured data within its shard. The operation executed to perform the domain index access in this explain plan may be:

```
Remote SQL Information (identified by operation id):
-----------------------------------------------------
4 - access("CTXSYS"."CONTAINS"("GDELT_DATA".
    "DOC",'HASPATH(/gkg/themes/theme)')>0)
```

As another example of how shard servers may use local indexes built on the semi-structured data within their shards to process remote SQL received from the catalog server, assume that the catalog server receives cross-shard query Q4:

```
Q4: select count(*) from GKD_DATA where json_textcontains(doc,
    '$.gkg.locations.location."@name"', 'Dublin' );
```

In response to receiving Q4 from a requesting entity, the catalog server may perform the operations shown in the following explain plan:

| Q4 Explain Plan | | |
|---|---|---|
| Id | Operation | Name |
| 0 | SELECT STATEMENT | |
| 1 | SORT AGGREGATE | |
| 2 | VIEW | VW_SHARD_0A7B4793 |
| 3 | SHARD ITERATOR | |
| 4 | REMOTE | |

The remote SQL sent to each of the shard servers when the catalog server executes this explain plan may be, for example:

```
Remote SQL Information (identified by operation id):
-----------------------------------------------------
4 - EXPLAIN PLAN INTO PLAN_TABLE@! FOR SELECT
    COUNT(*) FROM "GKD_DATA" "A1" WHERE
    JSON_TEXTCONTAINS2("A1"."DOC",'$.gkg.locations.location.
    "@name"','Dublin')=1
    /* coord_sql_id=2pfvj8ms9w6uu */ (accessing
    'ORA_SHARD_POOL.REGRESS.RDBMS.DEV.US.ORA-
    CLE.COM@ORA_MULTI_TARGET' )
```

As with the previous example, this remote SQL makes no mention of any index. However, the individual shard servers know of the shard-specific indexes on the semi-structured data of their shard, so those shard servers may compile the remote SQL to perform the operations specified in the following explain plan, which include accessing the domain index that was built on the semi-structured data in the shard.

| Id | Operation | Name |
|---|---|---|
| 0 | SELECT STATEMENT | |
| 1 | SORT AGGREGATE | |
| 2 | PARTITION RANGE ALL | |
| 3 | PARTITION HASH ALL | |
| * 4 | DOMAIN INDEX | OIDX |

The index access referred to in this domain plan may be carried out as illustrated by the following command:

```
Remote SQL Information (identified by operation id):
-----------------------------------------------------
4 - access("CTXSYS"."CONTAINS"("GKD_DATA"."DOC",'Dublin'
    INPATH (/gkg/locations/location/%40name)')>0)
```

Thus, any commands for creating indexes on semi-structured data that resides in sharded tables are pushed down to the respective shard servers. Further, any predicates that would benefit from use of those indexes are also pushed down to the shard servers in remote SQL, and it is left to each individual shard server to determine how to best execute the remote SQL based on the access structures it has available.

Relational View of Semi-Structured Data

Semi-structured data may be accessed as if the data were actually stored relationally. One way for semi-structured data to be accessed relationally is through the use of table functions, such as JSON_TABLE( ), and XMLTABLE( ).

Techniques are described herein for processing cross-shard queries that use such table functions. Specifically, according to one embodiment, the predicates containing such table functions are pushed down in the remote SQL that the catalog server sends to each shard server. For example, the following two cross-shard queries (Q5 and Q6) contain predicates that include table functions applied to semi-structured data:

```
Q5: SELECT DepartNo, jt.* FROM Departments,
JSON_TABLE(DepartInfo, '$.employees[*]' COLUMNS ename
varchar2(40) PATH '$.ename', gender varchar(1) PATH '$.gender');
Q6: /* create relational view */
create or replace view relvu_GKD_DATA
    as
    select t.id, v.lat, v.longt
    from GKD_DATA t ,
    json_table(doc, '$.gkg.locations.location[*]'
        columns
        lat number path '$."@lat"',
        longt number path '$."@long"')   v
;
Select * from relvu_GKD_DATA;
```

During cross-shard query compilation of such queries, the catalog server analyzes the query detects the table function for the semi-structured data. The cross-shard query pushes down to the shard servers the table function so that each shard server will individually evaluate the table function. The data generated by the table function must be later joined with the relations data from the main sharded table. For example, the following explain plan depicts the operations performed by the catalog server in response to query Q5:

| | Q5: Explain Plan | | | |
|---|---|---|---|---|
| Id | Operation | Name | Inst | IN-OUT |
| 0 | SELECT STATEMENT | | | |
| 1 | SHARD ITERATOR | | | |
| 2 | REMOTE | | LOOPBACK | R->S |

The remote SQL that the catalog server sends to each shard server in response to Q5 may be, for example:

```
Remote SQL Information (identified by operation id):
----------------------------------------------------
    2 - EXPLAIN PLAN INTO PLAN_TABLE@! FOR SELECT
        "A2"."DEPARTNO","A1"."ENAME",
        "A1"."GENDER" FROM "DEPARTMENTS"
        "A2",JSON_TABLE(
        "A2"."JCOL", '$.a' COLUMNS(
        "ENAME" VARCHAR2(40) PATH '$.ename'
        NULL ON ERROR,
"GENDER" VARCHAR2(1) PATH '$.gender' NULL ON ERROR) )
        "A1" /* coord_sql_id=bsvdh6fcj1mba */  (accessing
        'LOOPBACK.REGRESS.RDBMS.DEV.US.ORACLE.COM' )
```

As evident by this example, in the remote SQL, the JSON TABLE command is passed down to each of the shard servers. At the shard servers, execution of the JSON TABLE command produces a row source whose output is values from the semi-structured data that are organized as if they were structured relational data.

Q6 is an example of the creation of a relational view based on semi-structured data stored in a sharded table, and a query (Select * from relvu_GKD_DATA;) that accesses that view. According to one embodiment, the catalog server responds to view creation commands that involve semi-structured data in a sharded table by both (a) storing a definition of the view in the catalog, and (b) passing the view creation command to each of the shard servers. Each of the shard servers stores the corresponding view definition. Having stored the view definition, the individual shard servers are able to process any subsequent queries that reference the view.

In the present example, after each shard server has stored the view definition of relvu_GKD_DATA, the catalog server my compile the query "Select * from relvu_GKD_DATA" in the manner indicated by the following explain plan:

| Q6 Explain Plan PLAN_TABLE_OUTPUT | | | | | |
|---|---|---|---|---|---|
| 0 SELECT STATEMENT | | 200M | 189G | 706K (7) | 00:00:28 |
| 1 VIEW | VW_SHARD_360FFC3F | 200M | 189G | 706K (7) | 00:00:28 |
| 2 SHARD ITERATOR | | | | | |
| 3 REMOTE | | | | ORA_S~ | R->S |
| PLAN_TABLE_OUTPUT | | | | | |

```
Remote SQL Information (identified by operation id):
----------------------------------------------------
    3 - EXPLAIN PLAN INTO PLAN_TABLE@! FOR
SELECT "A2"."ID","A1"."LAT","A1"."LONG
T"
FROM "GDELT_GKG_COUNT_JSON" "A2",
JSON_TABLE("A2"."DOC", '$.gkg.locations.location[*]'
COLUMNS(
    "LAT" NUMBER PATH '$."@lat"' NULL ON ERROR ,
    "LONGT" NUMBER PATH '$."@long"' NULL ON ERROR )
) "A1"
/*coord_sql_id=6ppk15qranbs9 */ (accessing
    'ORA_SHARD_POOL.REGRESS.RDBMS.DEV.
    US.ORACLE.COM@ORA_MULTI_TARGET' )
```

This remote SQL, which is pushed to each shard server, sends the entire j son table( ) query from the catalog server to each shard server.

Compute Relational Schema from Semi-Structured Data in Cross-Shard Query

A "data guide" is a set of metadata that describes the structures of hierarchical data objects added to a collection of hierarchical data objects. Examples of hierarchical data objects are documents that conform to XML or data objects that conform to JSON. Data guides for semi-structured data, as well as techniques for creating and updating such data guides, are described in detail in U.S. patent application Ser. No. 14/699,685, filed Apr. 29, 2015, the entire contents of which are incorporated herein by this reference.

Because semi-structured data is not fully structured, the structure of the items in a collection may differ from item to item. In one embodiment, when applied to a semi-structured collection, the dataguide( ) operator returns metadata that indicates each distinct attribute found within the collection. Consequently, not all items in a collection will have all attributes returned when the dataguide( ) operator is applied to that collection. Because the number of attributes returned by the dataguide( ) operator may be very large, the datatype used to hold the results of the dataguide operator may be a character-based large object (CLOB).

According to one embodiment, when a catalog server receives a cross-shard query that references a data guide, the dataguide operator is pushed down to each of the shard servers in the remote SQL. For example, assume that the catalog server receives query Q7:

Q7: select json_dataguide(doc) from GKD_DATA

In query Q7, json_dataguide( ) is an aggregate function used to compute a relational dataguide schema from a JSON collection (such as the set of JSON items stored in the "doc" column of the GKD_DATA table). During cross-shard query compilation time, the catalog server identifies the schema computation aggregation function and pushes it down to each shard server to compute. During cross-shard query execution time, the catalog server runs the dataguide aggregation method over all dataguides received from each shard server and computes the global schema (a global "dataguide") over all semi-structured data stored in all shards.

The following explain plan indicates the operations performed by the catalog server in response to query Q7:

| Explain Plan for Q7: | | |
| --- | --- | --- |
| Id | Operation | Name |
| 0 | SELECT STATEMENT | |
| 1 | SORT AGGREGATE | |
| 2 | VIEW | VW_SHARD_0A7B4793 |
| 3 | SHARD ITERATOR | |
| 4 | REMOTE | |

The remote SQL sent by the catalog server to each of the shard servers in response to Q7 may be, for example:

```
----------------------------------------------------
 4 - EXPLAIN PLAN INTO PLAN_TABLE@! FOR SELECT "SYS".
"JSON_DATAGUIDE"("A1"."DOC") FROM "GKD_DATA" "A1" /*
coord_sql_id=fxcz0n30xxzcb */ (accessing
  'ORA_SHARD_POOL.REGRESS.RDBMS.DEV.
  US.ORACLE.COM@ORA_MULTI_TARGET' )
```

In this example, each shard server independently generates a data guide for the semi-structured data, from its respective shard, that is targeted by the query. The catalog server then receives these shard-specific data guides, unpacks/parses the information from the shard-specific data guides, and based on that information constructs a global data guide. In alternative embodiments, the remote commands sent to the shard servers to not cause creation of shard-specific data guides. Instead, the remote command simply requests scans of the primitive semi-structured information used to construct a data guide. Upon receiving the primitive information from the shard servers, the catalog server assembles the global data guide.

CROSS-SHARD QUERY BASED ON SCHEMA PRUNING

Conventional "shard pruning" is based on cross-shard query predicates that reference the sharding key. For example, assume that the sharding key is "name" and the sharded table is divided into three shards S1, S2 and S3 with the respective ranges A-L, M-S, and T-Z. Under these conditions, when a cross-shard query has the predicate "where name>"Peter", the catalog server inspects the sharding metadata to determine that it is not possible for any data in S1 to satisfy the predicate. Because S1 has no items that could satisfy the query, the catalog server only sends remote commands to the shard servers associated with S2 and S3.

According to one embodiment, when a predicate references an attribute of semi-structured data, the catalog server is configured to perform shard pruning based on such predicates regardless of whether the predicates involve the sharding key. Specifically, for a cross-shard query over semi-structured data, the catalog server uses a computed data guide, from each shard server, to do shard pruning based on which shards include an attribute specified in the predicate of the cross-shard query. For example, consider the cross-shard query (Q9):

```
Q9: SELECT count(*) FROM GKD_DATA WHERE
    JSON_EXISTS(doc,
    '$.gkg.sparse011');
```

Upon receiving query Q9, the catalog server uses the data guide from each catalog server to determine that gkg.sparse011 is only available on shards S1 and S3. Consequently, in processing query Q9, the catalog server only pushes remote commands to the shard servers that correspond to shards S1 and S3.

The catalog server may obtain the shard-specific data guides dynamically by sending a data guide request to each shard server in response to receiving query Q9. Alternatively, each shard server may dynamically maintain a persistent up-to-date data guide (or table with the information from which the data guide is constructed). In such cases, the catalog server may maintain a global data guide that is kept in sync with the shard-specific data guides, or may query the tables that contain the information for the shard-specific guides. In an alternative embodiment, to reduce the overhead of maintaining the global data guide information, the synchronization of the global data guide may not be immediate. Instead, the data may be updated periodically, on demand, or in response to specific events. In situations where the global data guild is permitted to go stale, the pruning decision may be made by the catalog server based on data that is not up-to-date, and the query results may be considered "approximate" rather than absolutely accurate. In some situations, such approximate results may be sufficient for the purposes for which the cross-shard query was submitted.

Construction of Semi-Structured Data from Sharded Relational Data

As explained above, table functions allow semi-structured data to be viewed as if it were relational data. According to one embodiment, techniques are also provided which allow relational data to be viewed and operated on as if it were semi-structured data. For example, consider the following query (Q8):

```
Q8: select JSON_ARRAY
        (JSON_ARRAY (DEPARTMENT_ID, DEPARTMENT_NAME),
         JSON_ARRAY (MANAGER_ID, LOCATION_ID))
    from departments;
```

Query Q8 calls for data extracted from the relational columns DEPARTMENT_ID, DEPARTMENT_NAME, MANAGER_ID, LOCATION_ID to be returned as a JSON_ARRAY which itself is formed of two JSON_ARRAYS. During cross-shard query compilation time, the catalog server analyzes such cross-shard queries and identifies semi-structured construction SQL operators, such as:
JSON_OBJECT( ),
JSON_ARRAY( ),
JSON_OBJECTAGG( ),
JSON_ARRAYAGG( ),
XMLElement( ),
XMLForest( ),
XMLConcat( ),
XMLAgg( ),
XMLComment( ),
XMLPI( ), Upon identifying any such semi-structured construction SQL operators, the catalog server marks them to be pushed to each shard server so that each shard server will individually evaluate those functions in each shard server locally, as shown in the explain plan:
Q8 Explain Plan:
Plan Hash Value: 1229964818

| Id | Operation        | Name | Inst      | IN-OUT |
|----|------------------|------|-----------|--------|
| 0  | SELECT STATEMENT |      |           |        |
| 1  | SHARD ITERATOR   |      |           |        |
| 2  | REMOTE           |      | ORA_SHAR~ | R->S   |

In the present example, the remote SQL that the catalog server sends to each shard server may be, for example:

```
Remote SQL Information (identified by operation id):
--------------------------------------------------
    2 - EXPLAIN PLAN INTO PLAN_TABLE@! FOR SELECT
        JSON_ARRAY(JSON_ARRAY("A1"."DEPARTMENT_ID",
        "A1"."DEPARTMENT_NAME"
        ABSENT ON NULL RETURNING VARCHAR2(4000)),
        JSON_ARRAY("A1"."MANAGER_ID", "A1"."LOCA-
        TION_ID" ABSENT ON NULL
        RETURNING VARCHAR2(4000)) ABSENT ON NULL
        RETURNING VARCHAR2(4000))
        FROM "DEPARTMENTS" "A1" /*
        coord_sql_id=fjb18pz6rgfu0 */ (accessing
        'ORA_SHARD_POOL.REGRESS.RDBMS.DEV.US.ORA-
        CLE.COM@ORA_MULTI_TARGET' )
```

Soda API for Semi-Structured Data in Sharding Environment

According to one embodiment, the catalog server exposes a SODA (Simple Object Data Access) API to provide a collection interface to store semi-structured data, such as JSON. The catalog server further supports query capability using QBE (Query By Example). By providing QBE and a SODA API, the relational database managed by the sharding system appears to be a No-SQL store to requesting entities that use the SODA API. In one embodiment, the SODA API is enhanced to add sharded object collections. Specifically, the catalog server allows users to decide to shard their collections and, then maps sharded collections as sharded tables. All QBE over sharded collections are rewritten to cross-shard SQL queries using semi-structured SQL operators that are optimized using techniques described above.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
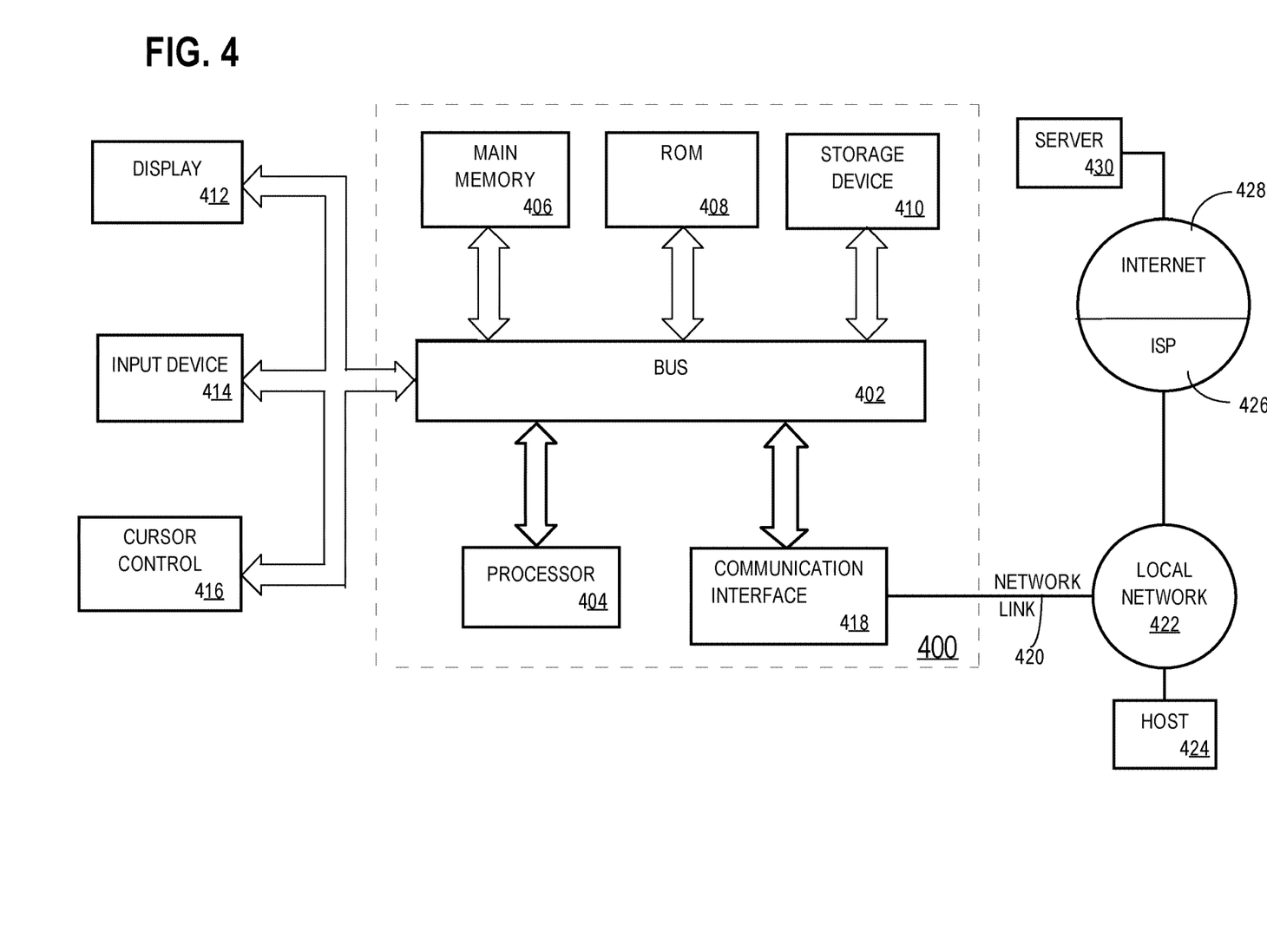
FIG. 4 is a block diagram of a computer system upon which embodiments of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, at a catalog server from a requesting entity, a cross-shard query;
   in response to receiving the cross-shard query, the catalog server sending remote commands to a plurality of shard servers;
   in response to sending the remote commands, receiving at the catalog server a lob locator from each shard server of the plurality of shard servers;
   wherein the plurality of shard servers includes a particular shard server that provided a particular lob locator to the catalog server in response to the remote commands;
   the catalog server encoding the particular lob locator with a shard identifier to produce an encoded lob locator that identifies the particular shard server;
   responding to the cross-shard query by providing the encoded lob locator to the requesting entity;
   receiving, at the catalog server from the requesting entity, a fetch request associated with the encoded lob locator;
   based on the shard identifier in the encoded lob locator, determining at the catalog server that the fetch request is to be pushed to the particular shard server; and
   the catalog server pushing the fetch request to the particular shard server.

2. The method of claim 1, wherein the lob locator comprises information used to retrieve unstructured data.

3. The method of claim 1, further comprising, in response to receiving the fetch request, extracting the shard identifier in the encoded lob locator.

4. The method of claim 1, wherein the cross-shard query indicates a particular results type to the cross-shard query.

5. The method of claim 4, wherein the particular results type is a by-reference type.

6. The method of claim 4, further comprising:
   in response to receiving the cross-shard query, the catalog server sending second remote commands to a second plurality of shard servers;
   in response to sending the second remote commands to the second plurality of shard servers, the catalog server receiving data from each shard server of the second plurality of shard servers;
   wherein the second plurality of shard servers includes a second particular shard server that provided particular data to the catalog server in response to the second remote commands;
   responding to the cross-shard query by providing the particular data to the requesting entity.

7. The method of claim 6, wherein the particular data comprises unstructured data.

8. The method of claim 4, further comprising:
   in response to receiving the cross-shard query, the catalog server sending a remote command to a second particular shard server;
   in response to sending the remote command to the second particular shard server, the catalog server receiving data from the second particular shard server;
   responding to the cross-shard query by providing the particular data to the requesting entity.

9. The method of claim 8, wherein the plurality of shard servers does not include the second particular shard server.

10. The method of claim 8, wherein the data comprises unstructured data.

11. One or more non-transitory computer-readable media storing instructions which, when executed by one or more computing devices, cause:
    receiving, at a catalog server from a requesting entity, a cross-shard query;
    in response to receiving the cross-shard query, the catalog server sending remote commands to a plurality of shard servers;
    in response to sending the remote commands, receiving at the catalog server a lob locator from each shard server of the plurality of shard servers;
    wherein the plurality of shard servers includes a particular shard server that provided a particular lob locator to the catalog server in response to the remote commands;
    the catalog server encoding the particular lob locator with a shard identifier to produce and encoded lob locator that identifies the particular shard server;
    responding to the cross-shard query by providing the encoded lob locator to the requesting entity;
    receiving, at the catalog server from the requesting entity, a fetch request associated with the encoded lob locator;
    based on the shard identifier in the encoded lob locator, determining at the catalog server that the fetch request is to be pushed to the particular shard server; and
    the catalog server pushing the fetch request to the particular shard server.

12. The one or more non-transitory computer-readable media of claim 11, wherein the lob locator comprises information used to retrieve unstructured data.

13. The one or more non-transitory computer-readable media of claim 11, wherein the instructions comprise instructions for, in response to receiving the fetch request, extracting the shard identifier in the encoded lob locator.

14. The one or more non-transitory computer-readable media of claim 11, wherein the cross-shard query indicates a particular results type to the cross-shard query.

15. The one or more non-transitory computer-readable media of claim 14, wherein the particular results type is a by-reference type.

16. The one or more non-transitory computer-readable media of claim 11, wherein the instructions comprise instructions for:
    in response to receiving the cross-shard query, the catalog server sending second remote commands to a second plurality of shard servers;
    in response to sending the second remote commands to the second plurality of shard servers, the catalog server receiving data from each shard server of the second plurality of shard servers;

wherein the second plurality of shard servers includes a second particular shard server that provided particular data to the catalog server in response to the second remote commands;

responding to the cross-shard query by providing the particular data to the requesting entity.

17. The one or more non-transitory computer-readable media of claim 16, wherein the particular data comprises unstructured data.

18. The one or more non-transitory computer-readable media of claim 11, wherein the instructions comprise instructions for:

in response to receiving the cross-shard query, the catalog server sending a remote command to a second particular shard server;

in response to sending the remote command to the second particular shard server, the catalog server receiving data from the second particular shard server;

responding to the cross-shard query by providing the particular data to the requesting entity.

19. The one or more non-transitory computer-readable media of claim 18, wherein the plurality of shard servers does not include the second particular shard server.

20. The one or more non-transitory computer-readable media of claim 18, wherein the data comprises unstructured data.

* * * * *

UNITED STATES PATENT AND TRADEMARK OFFICE
CERTIFICATE OF CORRECTION

PATENT NO. : 10,747,814 B2
APPLICATION NO. : 15/848737
DATED : August 18, 2020
INVENTOR(S) : Liu et al.

Page 1 of 1

It is certified that error appears in the above-identified patent and that said Letters Patent is hereby corrected as shown below:

In the Specification

In Column 6, Line 26, delete "JSON)))"" and insert -- JSON))" --, therefor.

In Column 7, Line 29, delete "SYS TWO," and insert -- SYS_TWO, --, therefor.

In Column 7, Lines 29-30, delete "SYS THREE)" and insert -- SYS_THREE) --, therefor.

In Column 13, Line 16, delete "0A7B 4793" and insert -- 0A7B4793 --, therefor.

In Column 16, Line 67, delete "XMILTABLE( )." and insert -- XMLTABLE( ). --, therefor.

In the Claims

In Column 25, Line 54, in Claim 6, delete "claim 4," and insert -- claim 1, --, therefor.

In Column 26, Line 3, in Claim 8, delete "claim 4," and insert -- claim 1, --, therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*